United States Patent [19]

Lowe et al.

[11] Patent Number: 4,561,576

[45] Date of Patent: Dec. 31, 1985

[54] VIDEO EQUIPMENT BAG

[75] Inventors: Greg E. Lowe, Boulder; Harold A. Jordan, Littleton, both of Colo.

[73] Assignee: Lowe Alpine Systems, Inc., Lafayette, Colo.

[21] Appl. No.: 560,914

[22] Filed: Dec. 13, 1983

[51] Int. Cl.$^4$ .............................................. A45F 3/02
[52] U.S. Cl. .................................. 224/209; 224/202; 224/151; 224/908
[58] Field of Search .............. D3/50, 33, 74; 224/908, 224/153, 204, 205, 208, 212, 264, 262, 259; 294/139, 146; 150/52 J; 206/316

[56] References Cited

U.S. PATENT DOCUMENTS

| | | | |
|---|---|---|---|
| D. 246,484 | 11/1977 | Wasserman | D3/74 X |
| D. 247,460 | 3/1978 | Sykes | D3/33 |
| D. 257,652 | 12/1980 | Katz et al. | D3/74 X |
| 1,301,421 | 4/1919 | Lethern | 224/216 |
| 3,363,814 | 1/1968 | Hall, Jr. et al. | 224/908 X |
| 3,900,140 | 8/1975 | Kelso et al. | 224/908 X |
| 4,260,004 | 4/1981 | Domke | 150/52 J X |
| 4,287,971 | 9/1981 | Doulet | 224/224 X |
| 4,431,041 | 2/1984 | Leiserson | 224/908 X |
| 4,462,525 | 7/1984 | Pingleton et al. | 224/210 |

*Primary Examiner*—Stephen Marcus
*Assistant Examiner*—Robert Petrik
*Attorney, Agent, or Firm*—O'Rourke & Harris

[57] ABSTRACT

A video equipment bag is disclosed that is useful both as a secure transporting case for video equipment and as a carrying case to facilitate ease of operation of a complete video equipment recording assembly, including allowing operational functioning of the components of the video recording equipment assembly without requiring removal of at least some such components from the case. The bag includes a plurality of interior compartments, each of which receives different components of the video recording equipment assembly to be utilized, and specifically includes compartments for receiving a video camera, a spare battery pack, accessories, and a video cassette recorder with the video cassette recorder being positioned so that the recorder controls are accessible through an opening at one side portion of the bag and external electrical cable connections can be made to the recorder through an opening at the bottom of the bag. The bag includes carrying handles, a shoulder harness that can be used with a camera harness attachable to the shoulder harness, and a removable shoulder strap so that the bag can be carried by hand, mounted as a backpack, or carried as a shoulder bag depending upon the use then desired.

23 Claims, 13 Drawing Figures

VIDEO EQUIPMENT BAG

FIELD OF THE INVENTION

This invention relates to an equipment bag and, more particularly, relates to a video equipment bag having multiple functional uses.

BACKGROUND OF THE INVENTION

Many bags, or cases, to carry various articles have been heretofore suggested and/or utilized, and such bags have heretofore included multiple compartments and/or have been of modular construction (see, for example, U.S. Pat. Nos. 4,081,061 and 4,334,601).

Various bags have heretofore also been suggested and/or utilized as camera bags, and such bags have also included pockets or compartments, some of which have included fasteners, such as Velcro strips, to alter the dimensions of the internal compartments. With respect to such bags, attention is drawn, for example, to U.S. Pat. Nos. 257,906, 258,701, 1,925,694, 2,827,096, 4,093,010, 4,210,186, 4,212,377, and 4,260,004, with such bags including a shoulder strap being shown, for example, in U.S. Pat. No. 4,323,180.

Bags for carrying video recorders have also been heretofore suggested and/or utilized, and such bags have included straps, access covers, and accessory pockets (see, for example U.S. Pat. Nos. 265,696 and 270,494).

SUMMARY OF THE INVENTION

This invention provides an improved bag for video equipment with the bag being usable for storing a complete video recording equipment assembly and also being mountable so as to be usable during operation of equipment such that at least a portion of the equipment may be utilized without removal from the bag. Through use of a shoulder strap or a shoulder harness, the hands of a user are freed for operation of the video equipment with portions of the equipment being accessible without removal from the bag.

It is therefore an object of this invention to provide an improved equipment bag.

It is another object of this invention to provide an improved video equipment bag suitable for carrying and storing a complete video recording equipment assembly.

It is still another object of this invention to provide an improved video equipment bag having a shoulder strap and harness means for user mounting of the bag to facilitate use of a complete video recording equipment system by the user.

It is still another object of this invention to provide an improved video equipment bag having multiple compartments.

It is still another object of this invention to provide an improved video equipment bag having compartments to allow access to equipment in the bag without requiring removal of such equipment from the bag.

It is yet another object of this invention to provide an improved video equipment bag having a first compartment for receiving a video camera and a second compartment for receiving a video cassette recorder with the second compartment having a first access through the side of the bag through which the controls of the recorder are accessiable and a second access through the bottom of the bag for cable access to the recorder.

With these and other objects in view, which will become apparent to one skilled in the art as the description proceeds, this invention resides in the novel construction, combination, and arrangement of parts substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Video equipment bag 17 is configured to carry, or store, a complete video recording equipment assembly, or package. Such as assembly could include, for example, a video camera 19 (as illustrated in FIGS. 12 and 13), a video cassette recorder 20 (as illustrated in FIG. 12), and various accessories such as a spare battery pack, extra recording tapes, a microphone and/or connecting cables 21 (as illustrated in FIGS. 12 and 13).

Figure 6:
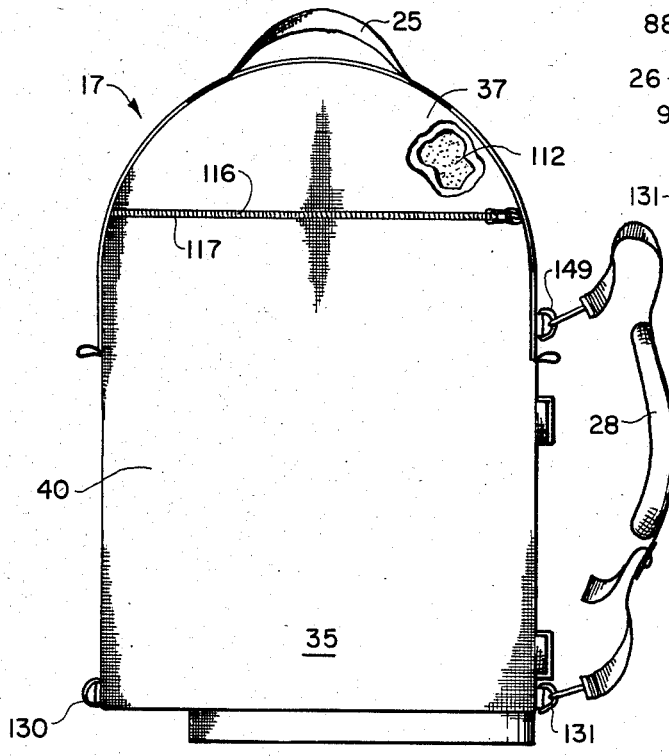
FIG. 6 is a rear elevation view of the video equipment bag shown in FIG. 1 with an attached shoulder strap being illustrated.
Figure 8:
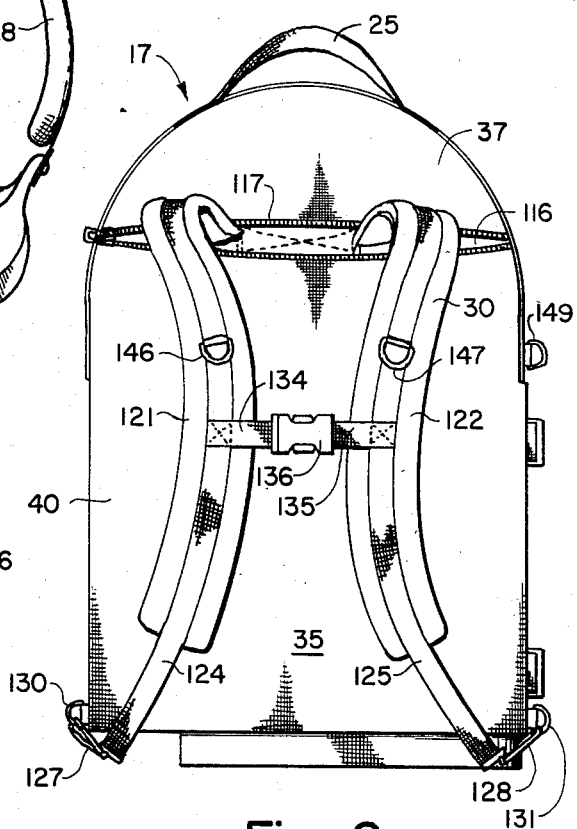
FIG. 8 is a rear elevation view of the video equipment bag similar to that shown in FIG. 6 but illustrating an attached shoulder harness.
Figure 12:
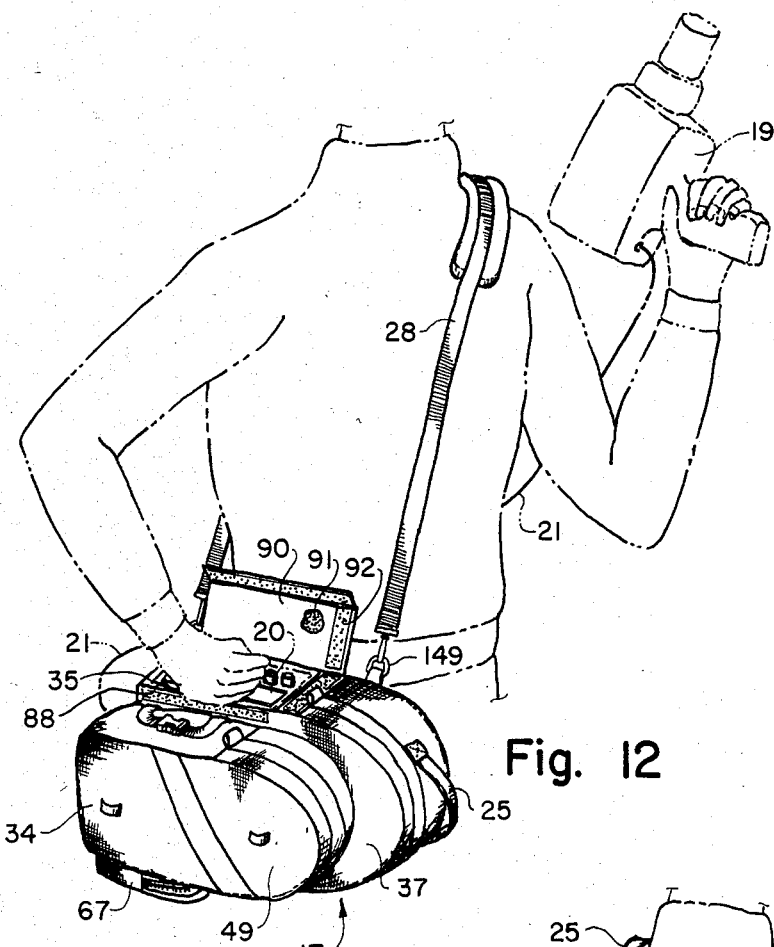
FIG. 12 is a partial perspective view illustrating shoulder mounting of the video equipment bag shown in FIG. 1.
Figure 13:
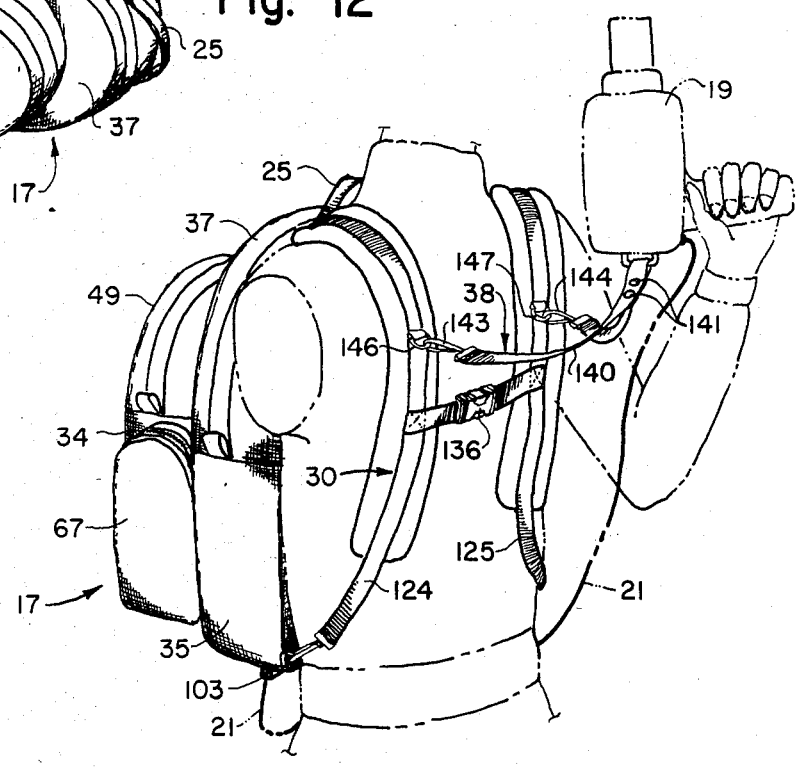
FIG. 13 is a perspective view illustrating backpack mounting of the video equipment bag shown in FIG. 1.

Bag 17 is designed to be hand-carried by means of handles 25 and/or 26, or may be mounted about the body of a user by means of shoulder strap 28 (as illustrated in FIGS. 6 and 12) or shoulder harness 30 (as illustrated in FIGS. 8 and 13).

Bag 17 includes two major sections, or compartments, 34 and 35, with compartment 34 being of a size to receive a conventional video camera 19 and compartment 35 being of a size to receive a conventional video cassette recorder (VCR) 20. A third compartment 37 is provided for storage of various equipment and mounting accessories such as shoulder strap 28, video camera harness 38 (as illustrated in FIG. 13), connecting cables 21 and recording tapes.

Figure 9:
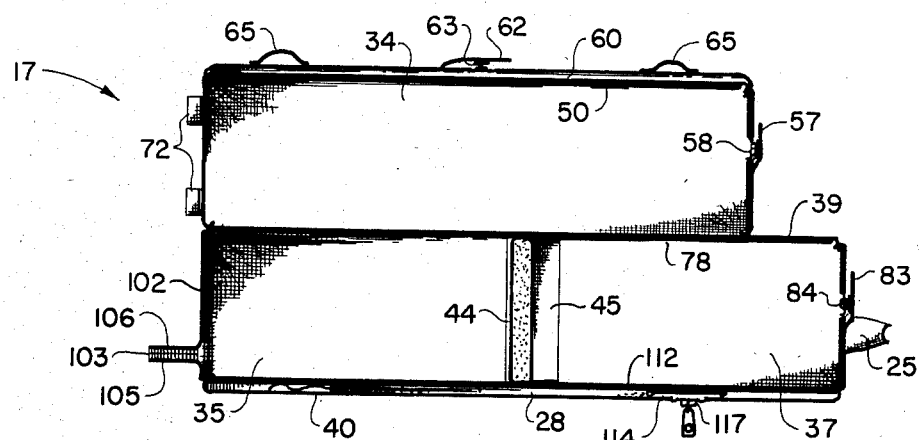
FIG. 9 is a sectional view taken through lines 9—9 of FIG. 2.
Figure 10:
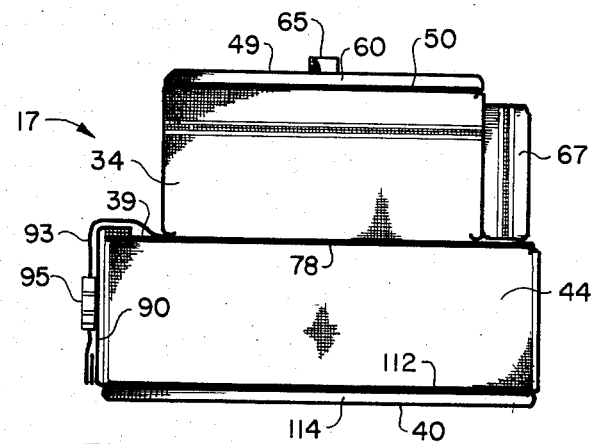
FIG. 10 is a sectional view taken through lines 10—10 of FIG. 2.
Figure 11:
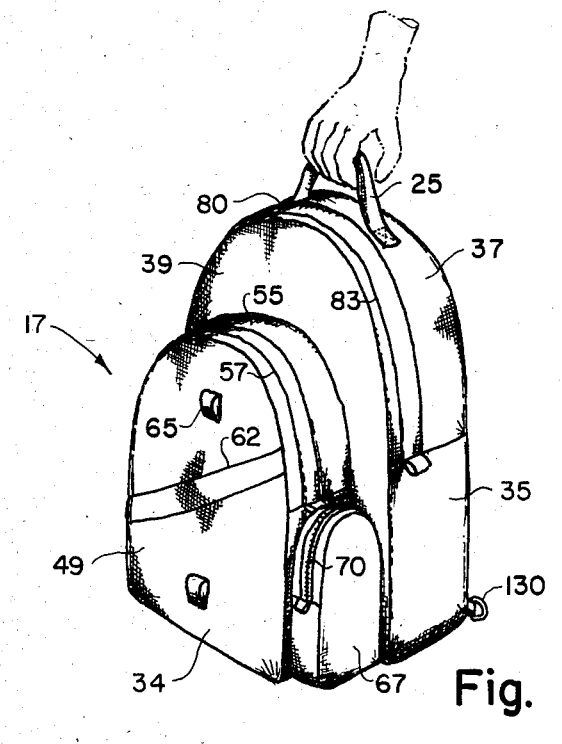
FIG. 11 is a partial perspective view illustrating hand carrying of the video equipment bag shown in FIG. 1.

Video recorder compartment 35 and accessory compartment 37 are positioned with compartment 37 above compartment 35, and are preferably integrally formed with a common front wall 39, a common back wall 40 and common side walls 41 and 42. A divider 44 (as illustrated in FIGS. 9 and 10) separates compartments 35 and 37. Divider 44 preferably includes an encased layer of padding material (such as foam encased in a nylon cover, for example, which can also be utilized for all encased layers of padding material referred to hereinafter), is removable, and is preferably positioned as a divider by Velcro strips 45.

Video camera compartment 34 is positioned in front of compartments 35 and 37 and has a front wall 49, which wall preferably has an encased layer of padding material 50 positioned behind the wall. Side walls 52 and 53, bottom wall 54 and curved top wall 55 complete video camera compartment 34. Opening 57, extending across the top and down left side 52 (as viewed from the front of the bag), provides access to video camera compartment 34, and a closure for opening 57 is provided by zipper 58. While not specifically shown, an encased layer of padding material can be provided within compartment 34 and is preferably positionable at the bottom and side walls.

Figure 1:
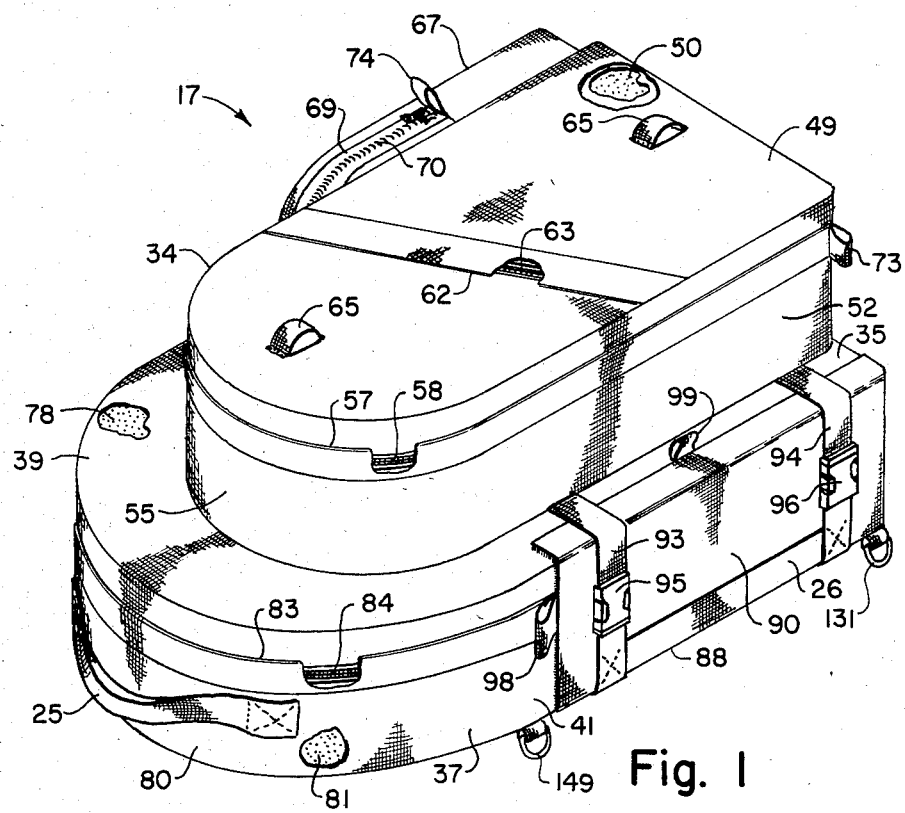
FIG. 1 is a perspective view of the video equipment bag of this invention.
Figure 2:
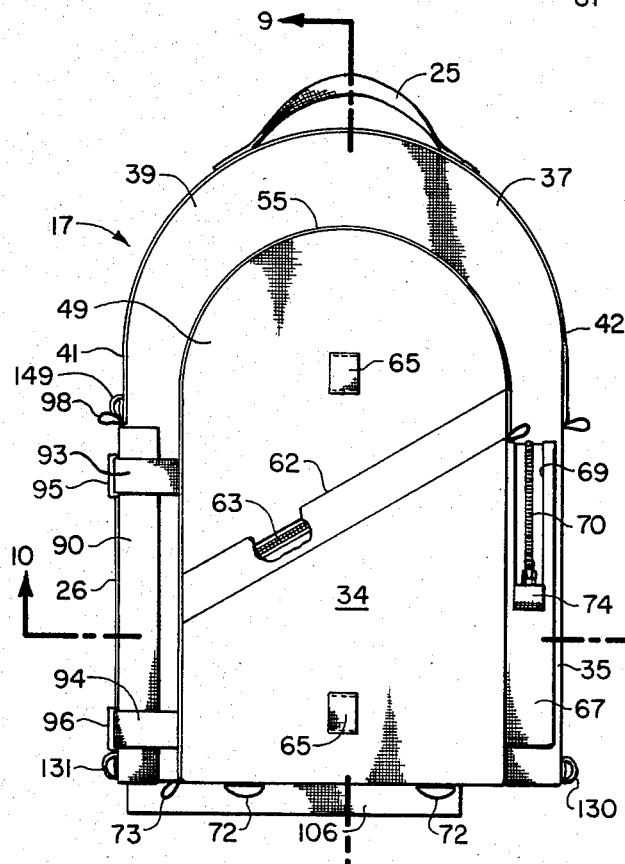
FIG. 2 is a front elevation view of the bag shown in FIG. 1.

A shallow pocket 60 (as shown in FIGS. 9 and 10) is provided between front wall 49 and padding layer 50, and preferably extends behind the entire front wall 49 so that the pocket can receive documentation such as instruction books and the like. Opening 62 (as shown in FIGS. 1 and 2) running at an angle across the central portion of front wall 60 provides access to the pocket. A closure for opening 62 in pocket 60 is provided by zipper 63.

As best shown in FIGS. 1 and 2, loops 65 are preferably provided near the top and bottom of front wall 49 of video camera compartment 34, and may be utilized to tie accessories (such as microphones, etc.) and/or other objects (such as jackets, etc.) to the front of the bag.

Figure 3:
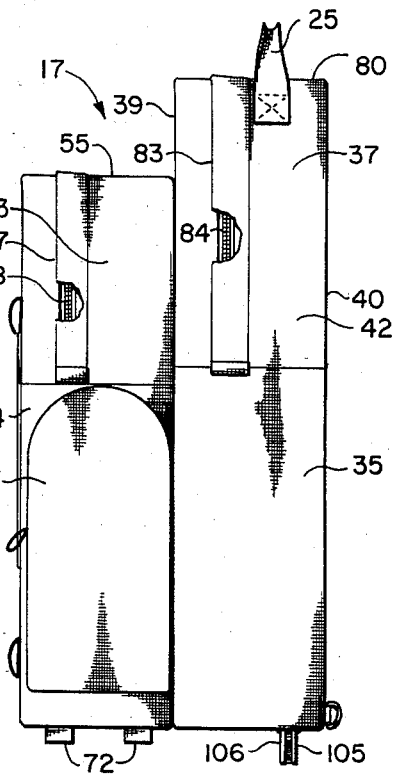
FIG. 3 is a right elevation side view (as viewed from the front of the bag) of the video equipment bag shown in FIG. 1.
Figure 4:
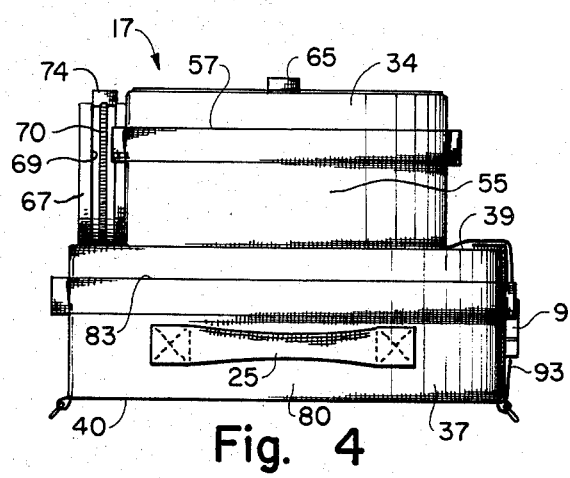
FIG. 4 is a top planar view of the video equipment bag as shown in FIG. 1.
Figure 5:
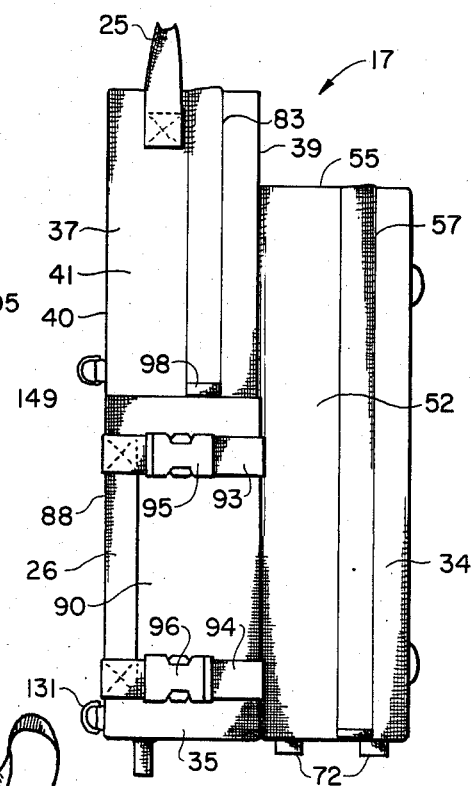
FIG. 5 is a left elevation side view (as viewed from the front of the bag) of the video equipment bag shown in FIG. 1.

As best shown in FIG. 3, a small pocket 67 is provided at the right side 53 (as viewed from the front of the bag) of video camera compartment 34, and access to pocket 67 is provided by opening 69 (as shown in FIG. 4) which extends across the top and upper side portions of the pocket. Pocket 67 is of a size to receive a spare battery pack, and a closure is provided for pocket 67 by zipper 70.

Figure 7:
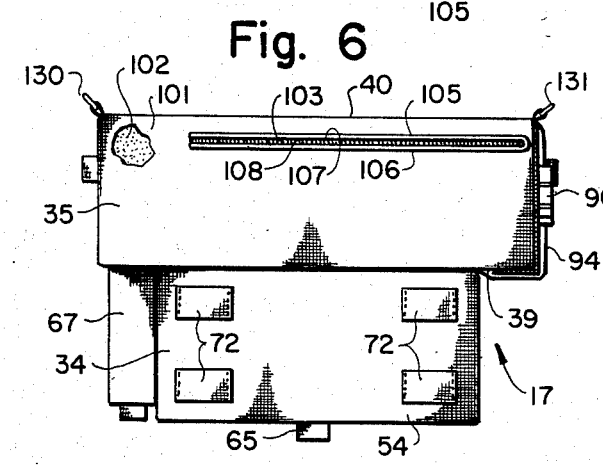
FIG. 7 is a bottom planar view of the video equipment bag shown in FIG. 1.

As best shown in FIG. 7, the bottom wall 54 of video camera compartment 34 includes loops 72 which receive straps (not shown) for tying equipment such as a tripod to the bag. In addition, an additional loop 73 is attached to the lower left edge of compartment 34 (see FIGS. 1 and 2), and still another loop 74 is attached to the left side of pocket 67 for use in facilitating zipper operation.

As best shown in FIG. 1, recorder and accessory compartments 35 and 37, taken together, are larger than camera compartment 34 and compartment 34 is secured to the common front wall 39 of compartments 35 and 37 so that front wall 39 provides the back wall for compartment 34. An encased layer of padding material 78 is provided adjacent to and behind front wall 39. Handle 25 is attached to the curved top wall 80 of compartment 37 and a layer of padding material 81 is provided behind the curved top wall 80 and the opposite side walls 41 and 42 of compartments 35 and 37. In addition, a partition (not shown) similar to divider 44 can be placed at the rear (i.e., near side wall 42) of compartment 35 to provide for video cassette recorders of different sizes, as does divider 44.

Opening 83 provides access to accessory compartment 37 through the top and sides of the bag at the front edge thereof, with a closure for opening 83 being provided by zipper 84.

As brought out hereinabove, compartment 35 is configured to receive a conventional video cassette recorder. An opening 88 is provided in side 41 of compartment 35. This opening permits the video cassette recorder to be inserted into compartment 35 with the controls at the front face of the recorder being thereafter readily accessible without removing the recorder from the bag.

A cover 90 is positioned at opening 88. Cover 90 is preferably a rectangularly shaped flat cover that is hinged at one side. When open, access is provided to the controls of the video cassette recorder positioned within compartment 35 through opening 88 and this allows the user to operate the recorder without requiring that the recorder be removed from the compartment. This is particularly advantageous when a shoulder strap is utilized (as shown in FIG. 12) to position the bag so that the recorder may be easily hand operated by the user.

When cover 90 is closed, the cover (which preferably includes an encased layer of padding material 91) protects the face of the recorder. The cover also preferably includes Velcro strips 92 about the periphery except at the hinged edge portion. In addition, a pair of straps 93 and 94 with buckles 95 and 96 thereon are provided for more secure closing of cover 90. Buckles 95 and 96 are oppositely connected so that the female portion of buckle 95 fits into the male portion of buckle 96 and the female portion of buckle 96 fits into the male portion of buckle 95. By so locking the buckles when the cover 90 is open, the buckles cannot slip or otherwise enter into compartment 35.

As best shown in FIG. 1, handle 26 extends between straps 93 and 94. A loop 98 is also provided at the central portion of side 41 to facilitate zipper operation, and a second loop 99 (see FIG. 1) is provided at the edge portion of cover 90 opposite to the hinged portion to facilitate opening and closing of the cover.

As shown in FIG. 7, bottom wall 101 of compartment 35 also includes an encased layer of padding material 102 and includes at the rear portion thereof an opening 103 that extends laterally almost entirely across bottom wall 101. A pair of protruding flaps 105 and 106 extend downwardly from bottom wall 101 and flaps 105 and 106 have Velcro strips 107 and 108 on facing portions thereof to releasably close opening 103. The purpose of this opening is to allow access for cables and the like to a video cassette recorder within compartment 35.

Back wall 40 of compartments 35 and 37 has an encased layer of padding material 112 therebehind and a pocket 114 is formed between back wall 40 and padding layer 112. Opening 116 near the top of back wall 40 provides access to the pocket and a closure for the pocket is provided by zipper 117.

Shoulder harness 30 includes padded straps 121 and 122 one end of each of which is attached inside pocket 114 near the top thereof adjacent to opening 116 so that when zipper 117 is open, the straps can extend from the pocket through the adjacent opening. Straps 121 and 122 have smaller straps 124 and 125 attached thereto and these straps extend beyond the free ends of straps 121 and 122 to hooks 127 and 128, which fasteners can be hooked to rings 130 and 131 at opposite sides of the bottom rear edge of the bag adjacent to compartment 35. The shoulder harness allows the bag to be worn by a user as a backpack as indicated in FIG. 13.

While not specifically shown, straps 124 and 125 may be made lengthwise adjustable, and, when used as a backpack, the pack is secured by straps 134 and 135 which are fastened at one end to straps 124 and 125, respectively, and have the mating portions of buckle 136 secured to at the free ends. When the shoulder harness is not used, it is tucked inside pocket 114 and zipper 117 is then closed to secure the harness within the pocket.

When shoulder harness 30 is used, video camera harness 38 is preferably attached to shoulder harness 30 as shown in FIG. 13. As shown, camera harness 38 includes a strap 140 having snap fasteners 141 at the central portion and hooks 143 and 144 at the opposite end portions. A camera is held by the central portion and hooks 143 and 144 are snapped to rings 146 and 147 on the shoulder harness.

When the bag is used with shoulder strap 28, strap 28 is fastened to rings 131 and 149 positioned at the rear side edge of the bag adjacent to compartments 37 and 35, respectively, so that the bag is at one side of a user as indicated in FIG. 12.

Bag 17 is preferably made of soft material such as nylon, for example, and the various sections are preferably conventionally fastened together, as by sewing.

In operation, bag 17 is loaded with video equipment to be stored, and/or utilized. The bag may then be carried from place to place by the provided handles (or alternately carried by use of the shoulder strap or shoulder harness).

For utilization, the shoulder strap or the shoulder harness may be fastened outside the bag, the video camera is removed from the bag, an electrical cable is connected between the recorder and the video camera, and the camera and recorder are then made ready for use (including assuring that a good battery pack has been inserted into the equipment).

When used with a shoulder strap, the user can operate the readily accessible controls of the recorder (which is normally left within the bag). When used with a shoulder harness, the controls are preferably preset and the recorder, along with any unused accessories left in the bag, are carried on the back of the user and thus out of the way.

After filming is completed, the video equipment is packed into the bag which again becomes a carrier, or storage, case. Since multiple compartments are utilized, the bag is able to store a complete video recording equipment assembly.

As can be appreciated from the foregoing, this invention provides an equipment bag that is particularly useful with video equipment.

We claim:

1. An equipment bag, comprising:
    first enclosure means having bottom, top, and a plurality of side walls defining a first compartment area within said first enclosure means;
    second enclosure means having bottom, top, and a plurality of side walls defining second and third compartment areas within said second enclosure means, one of said plurality of side walls of said first enclosure means being adjacent to one of said plurality of side walls of said second enclosure means;
    compartment area accessing means including first and second access means, said first access means being in a wall of said first enclosure means to provide access to said first compartment area and said second access means being in a wall of said second enclosure means to provide access to at least one of said second and third compartment areas, one of said first and second access means providing a control access means and being in one of said plurality of side walls so that said compartment area having said control access means associated therewith is adapted to receive a first component of equipment that is normally retained during use in said equipment bag with said first component of equipment having operational controls thereon and usable with other components of said equipment, and with said first equipment component being positioned so that said operational controls are maintained adjacent to said control access means; and
    multiple carrying means connectable with at least one of said first and second enclosure means to adapt said equipment bag for carrying during use whereby said bag can be oriented at least in substantially an upright position and in a position substantially normal to upright with said control access means being in each case adjacent to a user so that manipulation of said operational controls of said first component retained in said bag is facilitated.

2. The equipment bag of claim 1 wherein said second enclosure means includes divider means for separating said second and third compartments, wherein said first and second compartment area not having said control access means associated therewith is adapted to receive a least one of said other equipment components for carrying said equipment at times other than during use thereof, wherein said second access means provides access to said second compartment area, wherein said compartment area accessing means includes third access means in one wall of said second enclosure means to provide access to said third compartment area, and wherein said third compartment is adapted to receive at least a portion of said multiple means at times other than during use thereof.

3. The equipment bag of claim 1 wherein said multiple carrying means includes handle means secured to said enclosure means, and shoulder harness means and shoulder strap menas connectable to said second enclosure means, at least one of said shoulder harness means and said shoulder strap means being receivable in said third compartment when not in use, said shoulder harness means when in use being adapted to maintain said bag substantially upright so that said third compartment area is above said second compartment area with said top of said second enclosure means facing upwardly and with said central access means facing sideways near one side of said user, and said shoulder strap means when in use being adapted to maintain said bag positioned sideways so that said third compartment area is nearly horizontal with respect to said second compartment area, and said control access means faces upwardly near one side of said user.

4. The equipment bag of claim 1 wherein said first compartment area is adapted to receive a video camera, wherein said second compartment area is adapted to receive a video cassette recorder, and wherein said third compartment area is adapted to receive at least a portion of said multiple carrying means when not in use.

5. A video equipment bag, comprising:

first enclosure means having bottom, top and a plurality of side walls defing a first compartment area adapted to receive a video camera;

a second enclosure means having bottom, top and a plurality of side walls defining second and third compartment areas with said second compartment area being adapted to receive a video cassette recorder having operational controls thereon, said second enclosure means also having a dividing wall therein to separate said second and third compartment areas, and one of said plurality of side walls of said first enclosure means being adjacent to one of said plurality of side walls of said second enclosure means;

compartment area accessing means including a first access means in one of said walls of said first enclosure means to provide access to said first compartment area, second access means in a second one of said plurality of side walls of said second enclosure means to provide access to said second compartment area, and third access means in one of said walls of said second enclosure means to provide access to said third compartment area, said second enclosure means being adapted to maintain said operational controls of a video cassette recorder received within said second compartment area adjacent to said second access means; and multiple carrying means including handle means, shoulder harness means, and shoulder strap means connectable with said second enclosure means, at least one of said shoulder harness means and said should strap means being receivable in said third compartment area when not in use, said shoulder harness means when in use maintaining said video equipemnt bag substantially upright with the top walls of said first and second enclosure means facing upwardly and with said second access means facing sideways and being adjacent to a side of a user to facilitate actuation of siad operational controls of said video cassette recorder in said second compartment area through said second access means by said user, and said shoulder strap means when in use maintaining said bag substantially sideways with said bottom walls of said first and second enclosures positioned substantially normal with respect to said upright position of said bag and with said second access means facing upwardly near one side of a user to facilitate actuation of said operational controls of said video cassette recorder in said second compartment area through said second access means by said user.

6. The video equipment bag of claim 5 wherein said bag includes first and second shoulder strap fastening means, said first shoulder fastening means being connected with said second enclosure menas adjacent to said second compartment area and said second shoulder strap fastening means being connected with said second enclosure means adjacent to said third compartment area so that attachment of said shoulder strap means to said shoulder strap fastening means facilitates use of said video equipment bag as a shoulder bag.

7. The video equipment bag of claim 5 wherein said bag includes first and second pairs of shoulder harness attachment means, said first pair of said shoulder harness attachment means being connected with said second enclosure means adjacent to said third access means, and said second pair of said shoulder harness attachment means being connected with said second enclosure means adjacent to said second compartment area so that attachment of said shoulder harness means to said shoulder harness fastening means facilitates use of said video equipment bag as a backpack.

8. The video equipment bag of claim 5 wherein said compartment area accessing means includes bottom access means in said second enclosure means opening to said second compartment area to thereby provide a second access to a video cassette recorder when within said second compartment area.

9. The video equipment bag of claim 5 wherein said first enclosure means defines a first compartment area that is smaller in size than the combined area of said second and third compartment areas defined by said second enclosure means, and wherein said video equipment bag includes third enclosure means defining a battery pack compartment with said third enclosure means being adjacent to said first enclosure means and with said battery pack compartment area being smaller in size than said first compartment area.

10. The video equipment bag of claim 5 wherein said third access means is in said top wall of said second enclosure means, and wherein said shoulder strap means is receivable in said third compartment area of said second enclosure means when not in use.

11. The video equipment bag of claim 5 wherein said third access means is in a third wall of said plurality of side walls of said second enclosure means with said third wall being a back wall, and wherein said shoulder harness means is receivable in said third compartment area through said third access means when not in use.

12. The video equipment bag of claim 5 wherein said compartment area accessing means includes cover mens for removably closing said control access means, said cover means including securing means for securing said cover means in a closed position.

13. The video equipment bag of claim 12 wherein said cover means includes a rectangularly shaped cover portion, and wherein said securing means includes first and second fastening means extending over said cover means near opposite edges of said rectangularly shaped cover portion.

14. The video equipment bag of claim 13 wherein said bag includes second handle means extending between said first and second fastening means of said securing means.

15. The video equipment bag of claim 5 wherein said second enclosure means includes bottom access means in said bottom wall opening into said second compartment area, said bottom access means having closure means connected therewith which when open permits cable access to said video cassette recorder when within said second compartment area, said bottom access means including a pair of depending flaps having Velcro strips on facing portions thereof.

16. The video equipment bag of claim 5 wherein said bag includes pocket means connected at the front of said first compartment area, said pocket means being adapted to receive documentation.

17. The video equipment bag of claim 5 wherein said bag includes loop means for facilitating attachment of straps thereto for enabling carrying of equipment outside said bag.

18. The video equipment bag of claim 5 wherein said bag includes a video camera harness, wherein said shoulder harness means includes camera harness fastening means, and wherein said video camera harness is fastened to said shoulder harness means to facilitate video camera use.

19. A video equipment bag, comprising:

enclosure means providing at least first, second and third compartments for receiving different components of video equipment, said first compartment being adapted to receive a video camera, said second compartment being behind said first compartment when said bag is positioned upright and adapted to receive a video cassette recorder, and said third compartment being above said second compartment when said bag is positioned upright and adapted to receive equipment accessories including a shoulder strap, said top portions of said first and third compartments being curved with said top portion of said third compartment extending higher than the top portion of said first compartment and having handle means connected therewith;

top access means at said top portion of said first and third compartments through which said video camera and said equipment accessories may be inserted into and removed from said compartments, said top access means including closure means;

side access means at one side of said second compartment, said side access mens including moveable cover means having securing means connected therewith, said cover means when in an open position permitting access to said second compartment for insertion and removal of a video cassette recorder into and from said second compartment and also providing access to the operating controls of a video cassette recorder when within said second compartment;

bottom access means at the bottom of said second compartment, said bottom access means having closure means connected therewith and when open permitting cable access to a video cassette recorder when within said second compartment;

pocket means positioned behind said second and third compartments when said bag is positioned upright, said pocket means having closeable pocket access means at one portion thereof and being adapted to receive a shoulder harness when said harness is not in use;

shoulder strap fastening means connected with said second enclosure means adjacent to a rear portion of said second and third compartment areas when said bag is positioned upright so that attachment of said shoulder strap to said shoulder strap fastening means at the exterior of said bag facilitates use of said bag as a shoulder bag; and first and second shoulder harness attachment means, said first shoulder harness attachment means being adjacent to said pocket access means and said second shoulder harness fastening means being adjacent to the lower rear portion of said second compartment area when said bag is positioned upright so that attachment of said harness means to said shoulder fastening means at the exterior of said bag facilitates use of said bag as a backpack.

20. A method for carrying and utilizing equipment, one component of which has operational controls thereon and is normally retained during use in an equipment bag, said method comprising:

providing an equipment bag having enclosure means providing a plurality of compartment areas for receiving equipment components for carrying purposes, with one of said compartment areas being adapted to receive an equipment component having operational controls thereon;

providing access means in said enclosure means to each of said compartment areas with said access means to said one compartment area being a control access means with said one compartment area being configured such that said operational controls of said equipment component when said component is within said one compartment area are maintained adjacent to said control access means;

removing said equipment components from said compartment areas when desired for use while retaining said equipment component with said operational controls thereon in said one compartment area;

operationally connecting said equipment components for use;

providing carrying means for said equipment bag to adapt said equipment bag for carrying during use whereby said bag can be oriented at least in substantially an upright position and in a position substantially normal to upright with said control access means being in each case adjacent to a user so that manipulation of said operational controls of said equipment component retained in said bag is facilitated; and using said equipment, including manipulation of said operational controls, as needed, during use of said equipment.

21. The method of claim 20 wherein said equipment components include a video camera and a video cassette recorder having said operational controls thereon, and wherein said method includes retaining said recorder in said equipment bag during use of said equipment.

22. The method of claim 20 wherein providing of said carrying means includes providing a shoulder harness for carrying said bag positioned substantially upright as a backpack with said operational controls at one side adjacent to the user.

23. The method of claim 20 wherein providing of said carrying bag includes providing a shoulder strap for carrying said bag positioned substantially normal with respect to upright with said operational controls facing upwardly adjacent to the user.

* * * * *

UNITED STATES PATENT AND TRADEMARK OFFICE
CERTIFICATE OF CORRECTION

PATENT NO. : 4,561,576
DATED : December 31, 1985
INVENTOR(S) : Lowe et al.

It is certified that error appears in the above—identified patent and that said Letters Patent is hereby corrected as shown below:

```
Column 1, line 21, before "Pat." insert --Des.--.

Column 1, line 21, change "258,701" to --258,702--.

Column 1, line 29, before "Pat." insert --Des.--.

Column 1, line 67, change "accessiable" to--accessible--.

Column 6, line 46, after "multiple" insert --carrying--.

Column 6, line 51, change "menas" to --means--.

Column 7, line 6, change "defing" to --defining--.

Column 7, line 36, change "should" to --shoulder--.

Column 7, line 39, change "equipemnt" to --equipment--.

Column 7, line 43, change "siad" to --said--.

Column 7, line 59, change "menas" to --means--.

Column 8, line 38, change "mens" to --means--.
```

UNITED STATES PATENT AND TRADEMARK OFFICE
CERTIFICATE OF CORRECTION

PATENT NO. : 4,561,576

DATED : December 31, 1985

INVENTOR(S) : Greg E. Lowe et al.

It is certified that error appears in the above-identified patent and that said Letters Patent is hereby corrected as shown below:

Column 9, line 31, change "mens" to -- means --.

Signed and Sealed this

Thirtieth Day of September 1986

[SEAL]

Attest:

DONALD J. QUIGG

Attesting Officer     Commissioner of Patents and Trademarks